United States Patent van den Berg et al.

[11] Patent Number: 6,041,736
[45] Date of Patent: Mar. 28, 2000

[54] APPARATUS AND METHOD FOR AUTOMATICALLY MILKING ANIMALS

[75] Inventors: Karel van den Berg, BR Bleskensgraaf; René Fransen, ZD Vlaardingen, both of Netherlands

[73] Assignee: Maasland N.V., Netherlands

[21] Appl. No.: 09/038,482

[22] Filed: Mar. 4, 1998

Related U.S. Application Data

[63] Continuation of application No. PCT/NL97/00370, Jul. 1, 1997.

[30] Foreign Application Priority Data

Jul. 5, 1996 [EP] European Pat. Off. .............. 96201881

[51] Int. Cl.⁷ ................................ A01J 5/00; A01J 5/017
[52] U.S. Cl. ...................................... 119/14.02; 119/14.11
[58] Field of Search ............................. 119/14.02, 14.03, 119/14.08, 14.1, 14.11, 520

[56] References Cited

U.S. PATENT DOCUMENTS

| | | | |
|---|---|---|---|
| 5,000,119 | 3/1991 | Moreau et al. | 119/14.03 |
| 5,042,428 | 8/1991 | Van Der Lely et al. | 119/14.08 |
| 5,862,776 | 1/1999 | Van Den Berg | 119/14.1 |

*Primary Examiner*—Michael J. Carone
*Assistant Examiner*—Jeff Gellner
*Attorney, Agent, or Firm*—Penrose L. Albright

[57] ABSTRACT

An apparatus and method for automatically milking animals which include a milking compartment or compartments which have a milking unit comprising an automatic milking machine secured to a robot arm which extends from under the teats of the animal being milked to outside of the milking compartment. The robot arm outside the milking compartment is supported by a sidewardly pivotal portion which includes a piston and cylinder member for raising and lowering the milking unit and a further piston and cylinder movement for pivoting sidewardly a carrier included in the portion. A rail is disposed over the milking compartment either centrally or to one side, or if there is more than one milking compartment which are disposed side-by-side, then the rail extends longitudinally between the milking compartments. The carrier together with the piston and cylinder member and the piston and cylinder unit and the milking unit are movable via a motor and roller longitudinally along the rail, by the piston and cylinder member vertically, and by a piston and cylinder unit sidewardly so that the milking machine can be selectively disposed under the animal's teats for automatic connection of teat cups thereto or can be moved to the side so that the milking machine does not impede the animal from entering and exiting the milking compartment.

29 Claims, 4 Drawing Sheets

6,041,736

APPARATUS AND METHOD FOR AUTOMATICALLY MILKING ANIMALS

RELATED APPLICATION

This is a Continuation Application of PCT Application No. PCT/NL97/00370, filed Jul. 1, 1997.

FIELD OF THE INVENTION

The present invention relates to apparatus and a method for the automatically milking of animals, such as cows, comprising a milking unit for automatically connecting the teat cups of the machine to the teats of the cow.

BACKGROUND OF THE INVENTION

The object of the invention is to simplify the milking unit construction.

In accordance with the invention, the milking unit is hingeably connected to the apparatus so that the milking machine is generally horizontally moveable forwardly and rearwardly about one or more hinges disposed near the upper part of the animal. The invention also relates to an apparatus for automatically milking animals, such as cows, provided with at least one milking compartment and an automatic milking machine including a milking robot for automatically connecting teat cups to the teats of an animal to be milked, automatically milking the animal and automatically disconnecting the teat cups from the teats, the milking robot comprising a robot arm construction movable in the longitudinal direction of the milking compartment, said robot arm construction being provided with a robot arm pivotable under the udder of the animal and movable in height, which robot arm is adapted to serve as a carrier for the teat cups. In relation to known apparatus it will thus be possible to reduce the number of degrees in the robot arm construction by one. Besides the means for moving the entire robot arm construction in the longitudinal direction of the milking compartment, it will suffice to provide control piston and cylinder members for pivoting the robot arm and moving same in height. By performing a pivoting movement from the side of the milking compartment there will moreover be obtained the advantage that the robot arm can be adjusted into a position enabling to connect, in a reliable manner, the teat cups to teats of the animal that are directed somewhat outwardly.

In accordance with the invention, it is possible to move the robot arm construction in the longitudinal direction of the milking compartment by providing the robot arm construction with a supporting unit movable along one or more rails in the longitudinal direction of the milking compartment, relative to which supporting unit the pivotable portion of the robot arm construction is pivotable in sideward direction. In that case the supporting unit may be designed so as to be movable along the rails by means of a motor. The sideward pivoting movement can be achieved by means of a control piston and cylinder member which is active between the supporting unit and the pivotable portion of the robot arm construction. By designing the pivotable portion of the robot arm construction as a carrier extending substantially downwardly to which the robot arm is coupled, it is possible to achieve the movability in height of the robot arm. In a particular embodiment, parallel to the control piston and cylinder member enabling the movability in height of the robot arm, there may be provided one or more guide rods for counteracting a rotating movement of the robot arm relative to the carrier.

Although the pivotal axis may constitute the center line of a material axis about which the robot arm is capable of pivoting actually, it is possible to achieve an embodiment of the robot arm construction in which said pivotable axis is a virtual one. According to the invention, the robot arm construction is then provided with a supporting unit movable in the longitudinal direction of the milking compartment along at least one rail, as well as a quadrangle hinge construction by means of which the pivotable portion of the robot arm construction is pivotable sidewardly relative to the supporting unit.

In order to be able to perform a suitable sideward pivoting movement of the robot arm, the pivotal axis for the robot arm is preferably located approximately in the middle above the milking compartment. However, in particular when there are provided two milking compartments arranged side by side, it may be desirable to dispose the pivotal axis for the robot arm at the upper sides of the milking compartment or near thereto and between them. In that case it is possible to arrange one robot arm construction for both milking compartments. To that end there may be provided in particular pivoting means for pivoting at least part of the sidewardly pivotable portion of the robot arm construction around the center line of the downwardly extending portion of the robot arm construction.

Besides two milking compartments arranged side by side in longitudinal direction, there may also be provided several milking compartments arranged behind each other; in that case, the rail for the robot arm construction will extend along these milking compartments or thereabove. Finally it is noticed that the milking compartments may be arranged in a carrousel, the rail of the robot arm construction then extending in a circle along the carrousel or thereabove.

BRIEF DESCRIPTION OF THE DRAWINGS

For a better understanding of the invention, reference will now be made to the accompanying drawings, in which.

In the drawings corresponding parts are designated by the same reference numerals.

DESCRIPTION OF THE PREFERRED EMBODIMENTS

Figure 1:
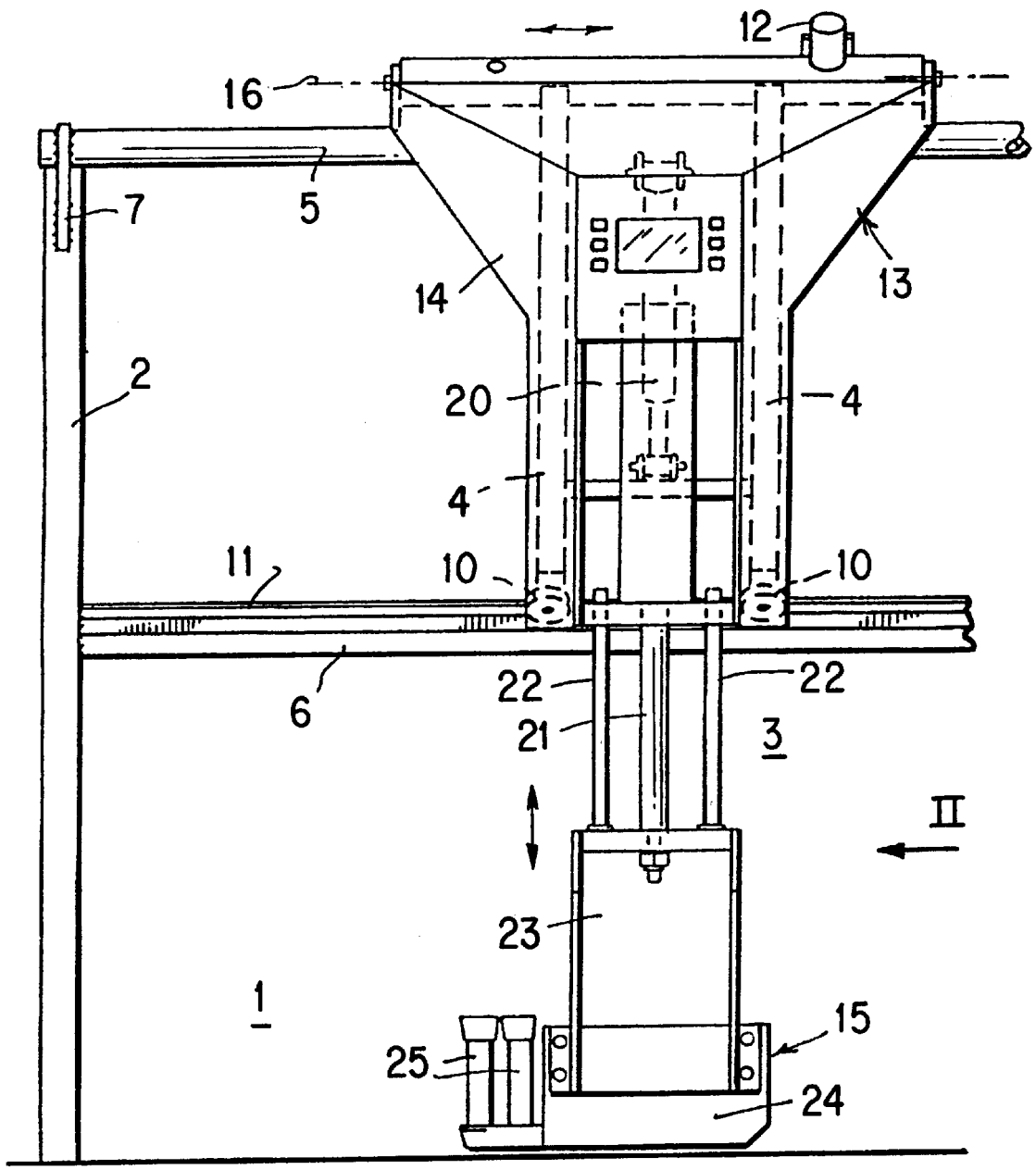
FIG. 1 shows a side elevational view of a robot arm construction in accordance with the invention.
Figure 2:
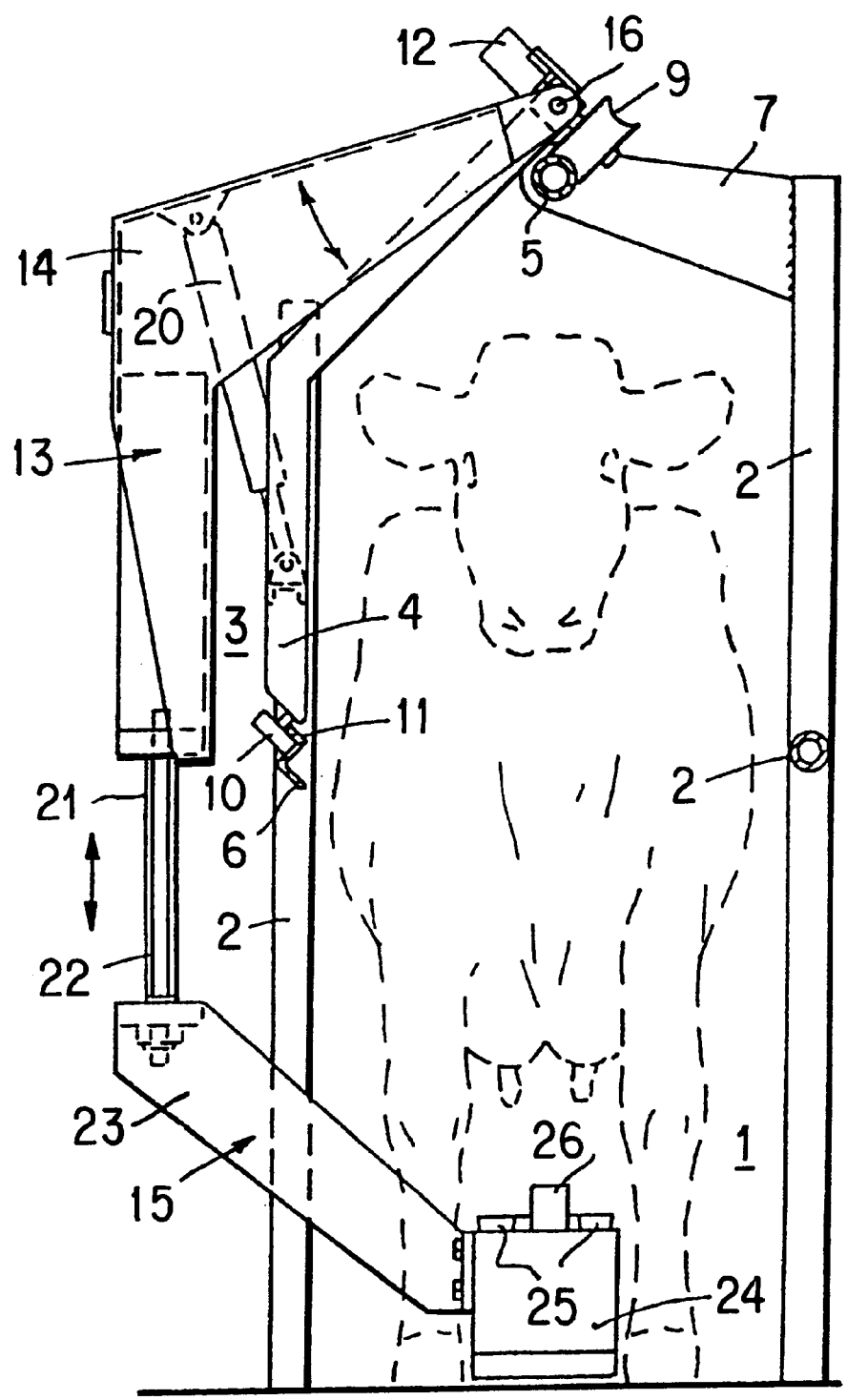
FIG. 2 is a front elevational view of a milking compartment in which the robot arm construction of FIG. 1 is shown schematically.
Figure 3:
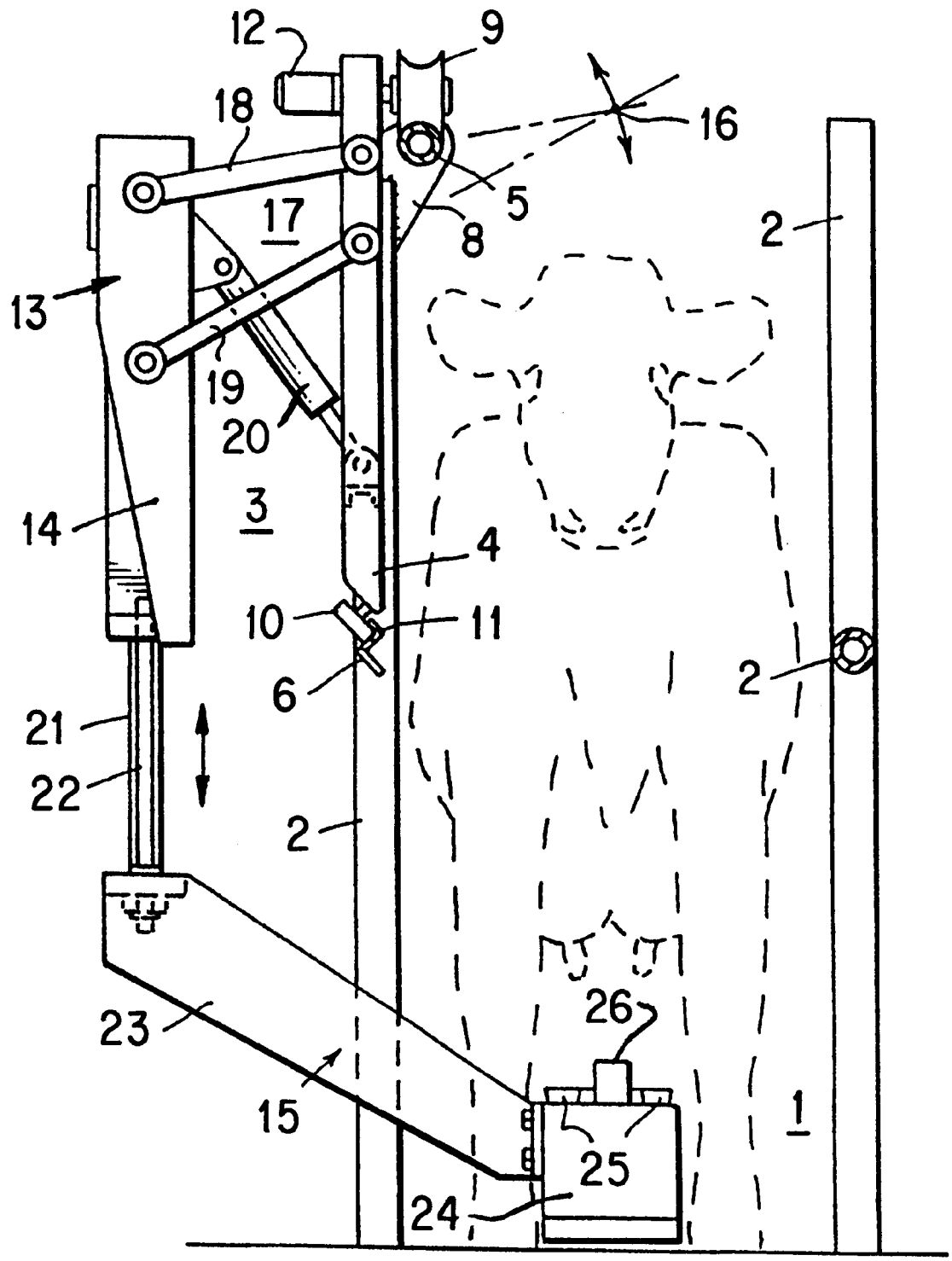
FIG. 3 shows another embodiment of such a robot arm construction in which the pivotal axis is a virtual one.

The milking compartment 1 shown in FIGS. 1 to 3 accommodates a single animal. Said milking compartment is surrounded in a customary manner by a framework 2 and provided with an entrance and exit door (not shown). In the milking compartment and in the immediate vicinity thereof there is provided an automatic milking machine which, besides the usual milking equipment, includes a milking robot for automatically connecting teat cups to the teats of an animal to be milked which is present in the milking compartment, automatically milking said animal and automatically disconnecting the teats cups from the teats. The milking robot comprises a robot arm construction 3 movable in the longitudinal direction of milking compartment 1. Said robot arm construction is provided with a supporting unit 4 which is movable along rails 5 and 6. In the embodiment of FIGS. 1 and 2, rail 5 is tubular and disposed centrally above milking compartment 1 in the longitudinal direction thereof by means of supports 7 attached to framework 2. In the embodiment of FIG. 3, rail 5 is also tubular but disposed on the side of the upper side of milking compartment 1 in the longitudinal direction thereof by means of supports 8 attached to framework 2 at the longitudinal side of the milking compartment where the robot arm construction is located. In both embodiments, rail 6 is disposed approximately midway of the height of the milking compartment at the longitudinal side of framework 2, i.e. at the side where the robot arm construction is located. Rail 6 is constituted by an angle section, the abutment face on which supporting unit 4 can be moved is located at an angle of approximately 45° disposed obliquely downwardly and outwardly relative to milking compartment 1. Both at its upper side and its under side supporting unit 4 is provided with rollers 9 and 10. In the embodiment of FIGS. 1 and 2, rollers 9 and 10 are attached to supporting unit 4 perpendicularly to each other and at an angle of approximately 45° relative to a vertical plane extending in the longitudinal direction of the milking compartment, in such a manner that supporting unit 4 is supported on rail 5 by means of rollers 9 and on rail 6 by means of rollers 10. In order to prevent supporting unit 4 from being pushed from the rails 5 and 6, there are provided locking means, e.g. constituted by an upright edge 11 provided on rail 6 or constituted by additional rollers (not shown), also attached to supporting unit 4 and arranged diametrically opposite rollers 9 relative to rail 5, so that rail 5 thus extends between the rollers. Supporting unit 4 is capable of being moved along rails 5 and 6 by means of a motor 12.

The robot arm construction is furthermore provided with a sidewardly pivotable portion 13 comprising a carrier 14 extending substantially downwardly and a robot arm 15 attached thereto. The sidewardly pivotable portion 13 and consequently also robot arm 15 are pivotable about a substantially horizontal pivotal axis 16 which is located at the upper side of the milking compartment or near thereto in the longitudinal direction thereof. Although, in the embodiment of FIGS. 1 and 2 as well as in the embodiment of FIG. 3 the pivotal axis 16 is located approximately in the middle above the milking compartment, in the embodiment of FIGS. 1 and 2 said pivotal axis constitutes the center line of the material pivotal axis for the sidewardly pivotable portion 13, while in the embodiment of FIG. 3 said pivotal axis is a virtual one which, moreover, during the pivoting movement of the sidewardly pivotable portion 13, moves upwardly. In the embodiment of FIGS. 1 and 2, the pivotal axis 16 and the center line of rail 5 are located in a substantially vertical plane. In the embodiment of FIG. 3, the sidewardly pivotable portion 13 is connected with supporting unit 4 by means of a quadrangle hinge construction 17, composed of arms 18 and 19, the distance between the hinge points of said arms on carrier 14 being larger than the distance between the hinge points of these arms on supporting unit 4.

In the two embodiments described so far, the sideward pivoting movement of portion 13 is achieved by means of a control piston and cylinder member 20 which is disposed between said pivotable portion 13 and supporting unit 4. As already mentioned, the sidewardly pivotable portion 13 comprises carrier 14 and robot arm 15. Robot arm 15 is connected movably in height with the carrier 14 by means of a control piston and cylinder unit 21. Parallel to this control piston and cylinder unit 21 are one or more guide rods 22 which are provided for counteracting a rotating movement of robot arm 15 about an axis in the longitudinal direction of control piston and cylinder unit 21 relative to carrier 14.

Robot arm 15 comprises a portion 23 extending obliquely downward in the direction of the milking compartment and a portion 24 extending horizontally. The latter portion 24 may be produced as the end piece of the robot arm construction as described in EP-A-O 360 354 or in EP-A-O 519 544, the description of this end piece as well as its function being incorporated by reference herein. Said end piece is adapted to serve as a carrier for the teat cups 25 and for a detector 26 by means of which the position of the teats can be determined.

In order to make it possible for an animal to enter milking compartment 1 without damaging the milking robot, the sidewardly pivotable portion 13 of the robot arm construction is pivotable outwardly to such an extent that the robot arm 15 is located almost entirely outside milking compartment 1. When an animal is present in the milking compartment and teat cups 25 have to be connected, robot arm construction 3 is first moved by means of motor 12 in the longitudinal direction of the milking compartment to such an extent, i.e. into a position in which robot arm 15 has pivoted entirely or almost entirely outside the milking compartment, that, by means of control piston and cylinder member 20, robot arm 15 can be pivoted under the animal into a position in which the detector 26 is capable of determining the position of the teats. By subsequently operating motor 12 and control cylinders 20 and 21, it is possible to connect teat cups 25 to the teats. After milking, the teat cups may be disconnected from the teats as described in the aforementioned EP-A-O 360 354. When adjusting a teat cup into the right position for connecting same to a relevant teat, the pivotability of robot arm 15 about the pivotal axis 16 may be of great advantage when the teats of an animal are directed somewhat outwardly; a situation which occurs in particular when a relatively considerable period of time has elapsed since the previous milking run.

Figure 4:
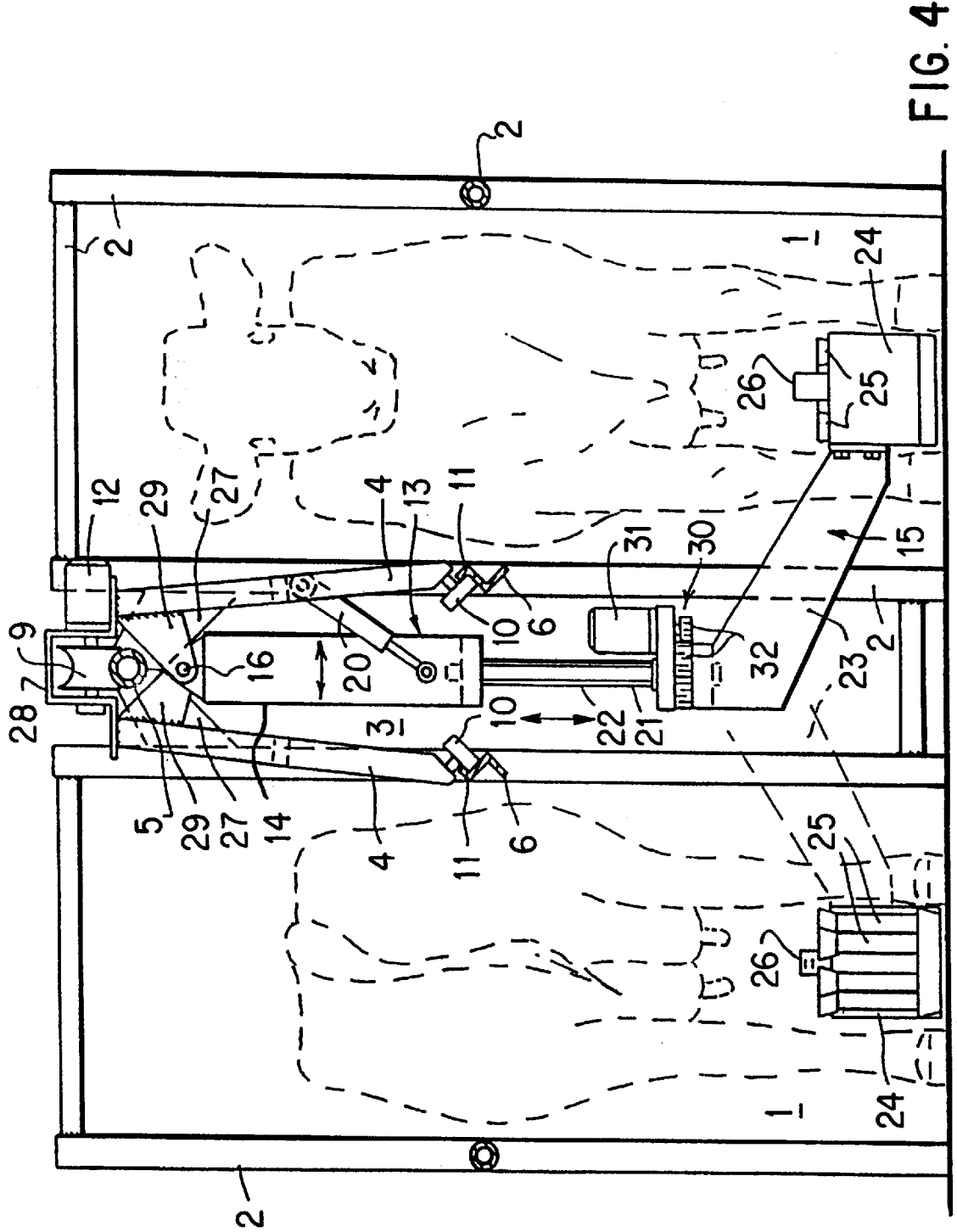
FIG. 4 is a front elevational view of the two milking compartments between which there is pivotably disposed a robot arm construction in again another embodiment according to the invention.

FIG. 4 shows an embodiment wherein two milking compartments are arranged side by side, while the robot arm construction 3 is located in the space between the two milking compartments. Upper rail 5, along which robot arm construction 3 is movable in the longitudinal direction of the milking compartments, is attached by means of supports 27 to frameworks 2 of the two milking compartments, more particularly, it is disposed midway between said milking compartments. In this case supporting unit 4 is composed of two portions which are connected to each other by means of a connecting element 28 in which rollers 9 are bearing-supported. By means of rollers 9, two portions of supporting unit 4 bear on the rail 5. Each of the two portions of supporting unit 4 is provided at its lower side with rollers 10, while each of the portions of supporting unit 4 is supported in the same manner as in the embodiment shown in FIGS. 1 to 3. The pivotable portion 13 is capable of pivoting sidewardly to a limited extent towards both milking compartments by means of control piston and cylinder member 20 which, also in this case, is disposed between said sidewardly pivotable portion 13 and supporting unit 4. The pivotal axis 16 is then located under rail 5. Carrier 14 is pivotable about pivotal axis 16 relative to supporting unit 4 by means of supports 29 attached to said supporting unit 4, at the ends of which supports 29 the material pivotal axis extends; also in this case the pivotal axis 16 constitutes the center line of the material pivotal axis. In this embodiment, robot arm 15 is indeed connected movably in height with the carrier 14 by means of the control piston and cylinder unit 21, but in this case the robot arm is also rotatable around the center line of said control cylinder with the aid of pivoting means 30. In this case, pivoting means 30 are constituted by a motor 31 and transmission means, such as gears 32. When moving the robot arm construction in the longitudinal direction of the milking compartments, it is difficult to pivot robot arm 15 sidewardly outside the two milking compartments, unless the space between the two milking compartments is relatively large. A rotative construction in which robot arm 15 can be adjusted into an intermediate position, i.e. a position in which portion 23 of the robot arm extends in the space between the two milking compartments, and into an operative position in the two milking compartments, offers the possibility to use one and the same robot arm construction 3 for both milking compartments and to keep the space between the milking compartments relatively small. However, because of the construction of horizontal portion 24 of robot arm 15, the two milking compartments have to be entered in opposite directions. The use of the two milking compartments in the manner as described with reference to the embodiment shown in FIG. 4 enables one to milk an animal in one milking compartment, while in the other milking compartment the teats of the animal are already cleaned so that, when the milking of an animal in one milking compartment has finished, the milking of the animal in the other milking compartment can start immediately.

Instead of arranging two milking compartments side by side, it is also possible to arrange two or more milking compartments behind each other. In that situation, the entrance and the exit of the milking compartments have to be disposed at the longitudinal side facing the one where the robot arm construction is located. In that case, rails 5 and 6 for robot arm construction 3 have to extend along all of the milking compartments or thereabove, so that the robot arm construction can be moved along one and the same rail from a position at the side of a milking compartment located therebehind or in front thereof into another position at the side of another milking compartment located therebehind or in front thereof. It is also possible to arrange the milking compartments in a circle or in a carrousel. In that situation, rails 5 and 6 along which the robot arm construction is then movable have to extend along the circle or carrousel or thereabove.

Finally it is noticed that the milking robot comprises a computer for controlling the automatic connection of the teat cups, the automatic milking of the animals and the automatic disconnection of the teat cups after milking. In particular the above-described possibilities of movement of robot arm 15 of robot arm construction 3 are under control of the computer; in other words, motors 12 and 31 and control piston and cylinder members 20 and units 21 are computer-controlled.

Although we have disclosed the preferred embodiments of our invention, it is to be understood that it is capable of other adaptations and modifications within the scope of the following claims:

1. An apparatus for automatically milking animals, such as cows, comprising a milking unit including a milking machine having teat cups for automatically connecting the teat cups of the milking machine to the teats of the cow, a milking compartment for receiving said milking unit, said milking unit being hingeably connected by a mobile hinge element to said milking compartment so that the milking machine is moveable in about a horizontal direction forwardly and rearwardly relative to said milking compartment, said hinge element extending at least as high as the upper part of the animal being milked.

2. An apparatus as claimed in claim 1 wherein said milking unit comprises a robot arm construction, a supporting unit for said robot arm construction being movable along a rail construction which is included in said hinge element, said supporting unit being movable along said rail construction in the longitudinal direction of said milking compartment, and said supporting unit being pivotable relative to said hinge element.

3. An apparatus as claimed in claim 2 wherein said hinge element comprises a further rail construction so that said hinge element comprises at least two rail constructions.

4. An apparatus as claimed in claim 3, wherein said milking compartment comprises a framework for confining an animal therein, said further rail construction being disposed near a side of said framework, said first mentioned rail construction being disposed above said milking compartment.

5. An apparatus as claimed in claim 4, wherein said framework confines the animal in said milking compartment when the animal is being milked, said other rail construction being arranged approximately mid-way between the longitudinal sides of said milking compartment as seen in plan.

6. An apparatus as claimed in claim 4 wherein said rail construction near the side of said framework is situated lower than said rail construction which is disposed above said milking compartment.

7. An apparatus as claimed in claim 3, wherein said supporting unit is movable along said two rail constructions, said milking compartment comprising a framework, said two rail constructions being disposed at different heights on said framework.

8. An apparatus as claimed in claim 2, comprising rollers which are disposed between said rail construction and said supporting unit so that said supporting unit is movable via said rollers along said rail construction.

9. An apparatus in accordance with claim 8, comprising a motor carried by said supporting unit for moving said supporting unit along said rail constructions.

10. An apparatus in accordance with claim 2, comprising a piston and cylinder member which is disposed between said framework and said supporting unit for selectively pivoting said supporting unit relative to said hinge element.

11. An apparatus as claimed in claim 1, wherein said milk unit comprises a robot arm and a carrier connected to said robot arm, said carrier being pivotable relative to said hinge element and extending substantially downwardly therefrom.

12. An apparatus in accordance with claim 11, wherein said robot arm is connected to said carrier so that said robot arm is movable in height relative to said carrier.

13. An apparatus in accordance with claim 12, comprising a piston and cylinder member which is disposed between said robot arm and said carrier for moving said robot arm vertically relative to said carrier.

14. An apparatus as claimed in claim 13, comprising guide rods which interconnect said carrier and said robot arm, said guide rods counteracting rotational movement of said robot arm relative to said carrier.

15. An apparatus as claimed in claim 1, wherein said milk unit comprises a carrier connected to said hinge element and a robot arm connected to said carrier, said carrier and said robot arm being sidewardly pivotable relative to said milking compartment so that said robot arm can be selectively moved inwardly to under an animal in said milking compartment and sidewardly substantially out of said milking compartment.

16. An apparatus as claimed in claim 15, wherein the pivotal axis for said robot arm is located approximately midway above said milking compartment as seen from above.

17. An apparatus as claimed in claim 16, comprising a supporting unit for said carrier, said milking compartment being provided with at least one rail which extends in the longitudinal direction of said milking compartment, said rail supporting said hinge element, the longitudinal center line of said rail being located in a substantially vertical plane which also contains the pivotal axis of said robot arm.

18. An apparatus in accordance with claim 1, wherein said milk unit comprises a robot arm for supporting said milking machine, said robot arm being sidewardly pivotal about a virtual pivotal axis disposed above an animal being milked in said milking compartment.

19. An apparatus as claimed in claim 1, wherein said milk unit comprises a robot arm construction and said mobile hinge element comprises a supporting unit and at least one rail, said supporting unit being movable in the longitudinal direction of said milking compartment along said at least one rail, said mobile hinge unit further comprising a quadrangle hinge construction for selectively moving said robot arm construction sidewardly relative to said supporting unit.

20. An apparatus as claimed in claim 19, wherein said at least one rail is located proximate the side of the milking compartment.

21. An apparatus as claimed in claim 1, comprising a further milking compartment, said first mentioned milking compartment and said further milking compartment being arranged side-by-side, said hinge element being disposed proximate the upper adjacent sides of said milking compartments.

22. An apparatus as claimed in claim 21, wherein said milk unit comprises a robot arm construction connected to said milking machine, the apparatus further comprising pivoting means included in said hinge element, said pivoting means selectively pivoting said robot arm construction and said milking machine from said further milking compartment to said first mentioned milking compartment and vice versa.

23. An apparatus as claimed in claim 1, comprising a further milking compartment, a robot arm construction to which said milking machine is connected, said robot arm construction being connected to said hinge element, a rail extending along both of said milking compartments, said robot arm construction being selectively movable from said first mentioned milking compartment to said further milking compartment and vice versa.

24. An apparatus as claimed in claim 1, comprising a plurality of milking compartments, including said first mentioned milking compartment, which are arranged in a circle, said hinge element comprising at least one rail extending in a circle adjacent said milking compartments, said milk unit comprising a robot arm construction which is connected to said milking machine, said robot arm construction being connected to said hinge element so that it is movable along said at least one rail.

25. An apparatus for automatically milking animals comprising a milking compartment, said milking compartment comprising a framework for confining an animal being automatically milked, a milking robot construction, said framework being associated with a rail for hingedly supporting said milking robot construction from a position which is higher than the upper part of the animal being milked, said milking robot construction comprising a sideways pivotable portion extending from said position to outboard of and along said framework and a robot arm extending from said sideways pivotable portion outboard of said framework to inboard of said framework to a location under the teats of the animal being milked in said milking compartment, and means for rotating said milking robot construction relative to said rail for selectively moving said sideways pivotable portion to said location under the teats of an animal in said milking compartment and sidewardly away from said location so that it does not impede an animal from entering and leaving said milking compartment.

26. An apparatus in accordance with claim 25, wherein said rail is centered longitudinally over said milking compartment.

27. An apparatus in accordance with claim 25, wherein said rail extends longitudinally at one side of said milking compartment at a height greater than the height of the animal being milked in said milking compartment.

28. A method of milking animals comprising supporting a robot arm from a horizontally disposed rail which is arranged above the animal to be milked at a height above the ground which is higher than the height of the animal to be milked while standing on such ground below such rail, moving said robot arm along said rail to position said robot arm about laterally beside the udder of the animal to be milked, pivoting said robot arm from said rail so that it moves transversely relative to said rail and relative to the animal to be milked to place teat cups carried by said robot arm under the teats of the animal to be milked, milking said animal by automatically connecting said teat cups to the teats of the animal which is to be milked, disconnecting said teat cups from the animal at the completion of milking said animal by means of said teat cups and withdrawing said robot arm and said teat cups from under the teats of the animal which has been just milked.

29. An apparatus for milking animals comprising milking machines having teat cups which are included in milking units for automatically connecting said teat cups to the teats of animals to be milked by the apparatus, the apparatus arranged to comprise a carrousel, a rail circumjacent relative to said carrousel, and a robot arm construction connected to said rail by pivot means included therein so that said robot arm construction is movable along said rail and is pivotable about said pivot means in a direction transverse to said rail, said robot arm construction carrying said milking machines so as to be pivotable from said pivot means selectively to positions under and away from the teats of an animal to be milked in said carrousel.

* * * * *